United States Patent
Li et al.

(10) Patent No.: US 10,303,685 B2
(45) Date of Patent: May 28, 2019

(54) DATA TABLE PERFORMANCE OPTIMIZATION

(71) Applicant: International Business Machines Corporation, Armonk, NY (US)

(72) Inventors: Shuo Li, Beijing (CN); Shu Hua Liu, Beijing (CN); Xin Ying Yang, Beijing (CN); Jian W. Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 14/732,918

(22) Filed: Jun. 8, 2015

(65) Prior Publication Data

US 2016/0357751 A1 Dec. 8, 2016

(51) Int. Cl.
*G06F 16/2453* (2019.01)
*G06F 16/21* (2019.01)
*G06F 16/41* (2019.01)
*G06F 16/22* (2019.01)
*G06F 16/2457* (2019.01)
*G06F 7/08* (2006.01)

(52) U.S. Cl.
CPC ............ *G06F 16/2453* (2019.01); *G06F 7/08* (2013.01); *G06F 16/21* (2019.01); *G06F 16/2282* (2019.01); *G06F 16/24578* (2019.01); *G06F 16/41* (2019.01)

(58) Field of Classification Search
None
See application file for complete search history.

(56) References Cited

U.S. PATENT DOCUMENTS

| 7,966,343 | B2 | 6/2011 | Yang et al. |
| 8,635,195 | B2 | 1/2014 | Christian et al. |
| 8,719,312 | B2 | 5/2014 | Jin et al. |
| 8,782,100 | B2 | 7/2014 | Yoon et al. |
| 8,832,594 | B1 | 9/2014 | Thompson et al. |

(Continued)

FOREIGN PATENT DOCUMENTS

| WO | 2016180811 A1 | 11/2016 |
| WO | 2016196856 A1 | 12/2016 |

OTHER PUBLICATIONS

List of IBM Patents or Patent Applications Treated as Related, Appendix P, Filed Herewith, 2 pages.

(Continued)

*Primary Examiner* — Uyen T Le
(74) *Attorney, Agent, or Firm* — Isaac J. Gooshaw

(57) ABSTRACT

A method to optimize a database is provided. A processor determines a frequency of search for a plurality of columns in a table. A processor determines a length of the plurality of columns. A processor determines a rank for the plurality of columns based, at least in part, on both the frequency of search and the length of the plurality of columns. A processor generates a first set of combinations of the plurality of columns. A processor determines an optimization of the first set of combinations of the plurality of columns. A processor selects an optimal combination of the first set of combinations, wherein the optimization of the optimal combination is greater than the optimization for all other combinations in the first set of combinations. A processor moves the plurality of columns excluded from the optimal combination.

18 Claims, 5 Drawing Sheets

(56) References Cited

U.S. PATENT DOCUMENTS

| | | |
|---|---|---|
| 9,171,073 B1 | 10/2015 | Ye et al. |
| 9,430,473 B1* | 8/2016 | Li et al. |
| 2007/0130140 A1* | 6/2007 | Cytron ............... G06F 17/30985 |
| 2011/0208754 A1 | 8/2011 | Li et al. |
| 2012/0143913 A1* | 6/2012 | Beier ...................... H03M 7/40 |
| | | 707/776 |
| 2014/0188924 A1 | 7/2014 | Ma et al. |
| 2015/0019528 A1* | 1/2015 | Vijayan ............... G06F 17/3048 |
| | | 707/713 |
| 2015/0032684 A1 | 1/2015 | Gupta |
| 2015/0149508 A1 | 5/2015 | Luo et al. |
| 2015/0178305 A1* | 6/2015 | Mueller ............ G06F 17/30129 |
| | | 707/693 |
| 2015/0213107 A1 | 7/2015 | Park et al. |
| 2015/0278255 A1 | 10/2015 | Battaglia et al. |
| 2015/0347426 A1 | 12/2015 | Dickie et al. |
| 2016/0357798 A1 | 12/2016 | Li et al. |

OTHER PUBLICATIONS

Li, et al., "Data Table Performance Optimization", U.S. Appl. No. 14/977,831, filed Dec. 22, 2015.
"Determining when to reorganize tables and indexes", pp. 1-3, provided on the search report dated Sep. 30, 2014, <http://www-01.ibm.com/support/knowledgecenter/api/content/nl/en-us/SSEPGG_9.5.0/com.ibm>.
Li, et al., "Data Table Performance Optimization", U.S. Appl. No. 15/407,355, filed Jan. 17, 2017.
List of IBM Patents or Patent Applications Treated As Related. Filed Feb. 15, 2017. 2 Pages.

\* cited by examiner

DATA TABLE PERFORMANCE OPTIMIZATION

BACKGROUND OF THE INVENTION

The present invention relates generally to the field of database management, and more particularly to optimizing column arrangement of a table.

Databases store large amounts of information. Specific bits of data are accessed by queries written in a particular interface language, such as Structured Query Logic (SQL). Databases are accessed with such queries through software typically referred to as Database Management Systems (DBMS). Database optimization involves maximizing the speed and efficiency with which data is retrieved by the DBMS from a database. By making choices in how a database is designed or arranged, the performance of enhancement of the DBMS can be increased.

SUMMARY

Embodiments of the present invention provide a method, system, and program product to optimize a database. A processor determines a frequency of search for a plurality of columns in a table. A processor determines a length of the plurality of columns. A processor determines a rank for the plurality of columns based, at least in part, on both the frequency of search and the length of the plurality of columns. A processor generates a first set of combinations of the plurality of columns. A processor determines an optimization of the first set of combinations of the plurality of columns. A processor selects an optimal combination of the first set of combinations, wherein the optimization of the optimal combination is greater than the optimization for all other combinations in the first set of combinations. A processor moves the plurality of columns excluded from the optimal combination.

DETAILED DESCRIPTION

Figure 1:
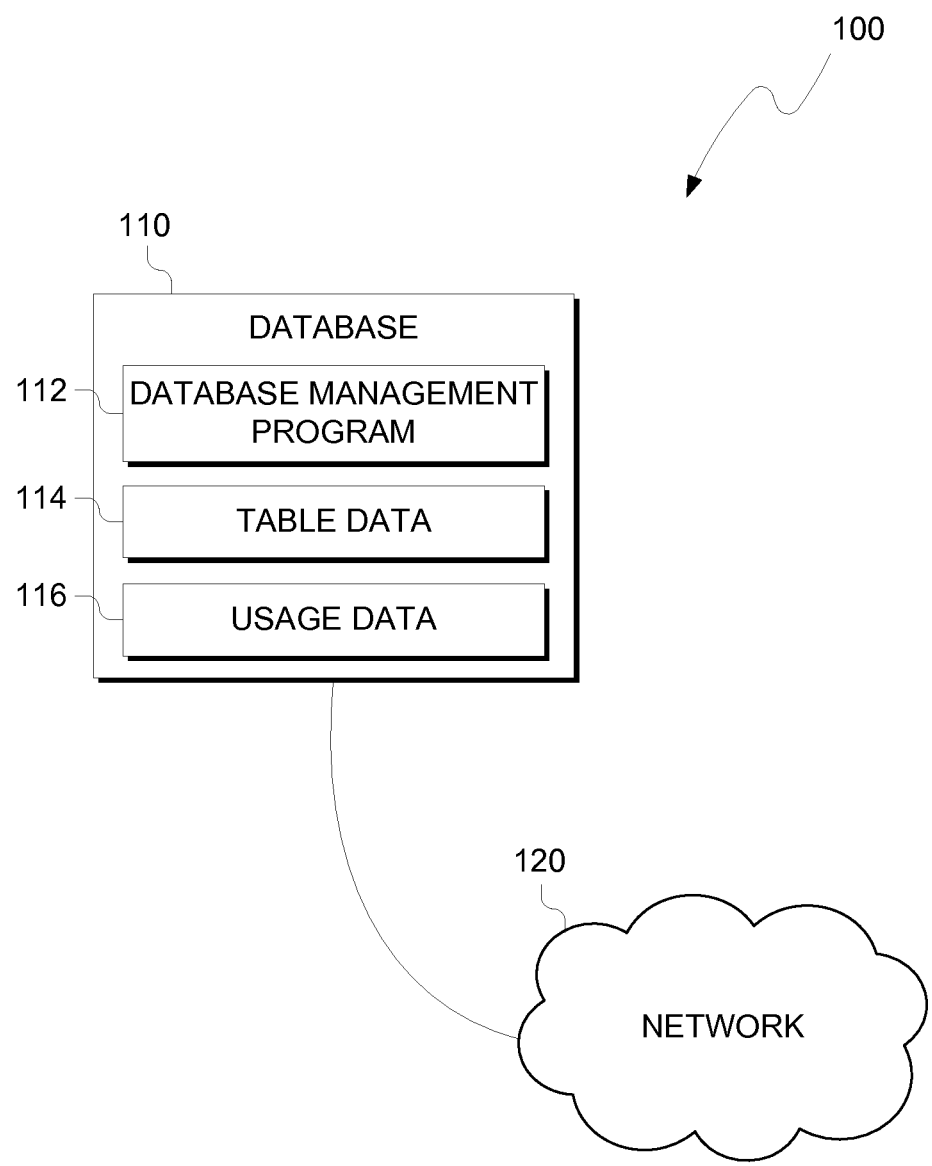
FIG. 1 is a functional block diagram illustrating a networked environment, in accordance with an exemplary embodiment of the present invention.

While solutions to database optimization are known they typically require manual analysis and changes by database administrators to achieve optimal performance. Embodiments of the present invention recognize that by collecting usage data of the database, such as specific data received in queries, the data tables of the database can be optimized for faster access by users without intervention of a database analyst or database designer. Columns in a data table with higher access frequencies can be maintained in the current database storage. However, by moving less frequently used columns to a different storage space in the database, a greater performance and fewer requirements of the database can be achieved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes database 110 connected over network 120. Database 110 includes database management program 112, table data 114 and usage data 116.

In various embodiments of the present invention, database 110 is a computing device that can be a standalone device, a server, a laptop computer, a tablet computer, a netbook computer, a personal computer (PC), or a desktop computer. In another embodiment, database 110 represents a computing system utilizing clustered computers and components to act as a single pool of seamless resources. In general, database 110 can be any computing device or a combination of devices with access to table data 114 and usage data 116 and is capable of executing database management program 112. Database 110 may include internal and external hardware components, as depicted and described in further detail with respect to FIG. 4.

In this exemplary embodiment, database management program 112, table data 114, and usage data 116 are stored on database 110. However, in other embodiments, database management program 112, table data 114, and usage data 116 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between database 110 and other devices (not shown), in accordance with a desired embodiment of the present invention.

In exemplary embodiments, database 110 includes database management program 112 to manage and provide access to table data 114. Table data 114 includes a variety of data structures or database models for organizing data. For purposes of this disclosure, table data 114 includes rows and columns in a table, where each row is an entry or record in table data 114 with the columns designating the values contained in the records. For example, database 110 stores a table in table data 114 of employee records. Each employee record has an employee first name, an employee last name, a home address of the employee, and an employee identification number. Each employee is a row in table data 114 and the values (e.g., a given employee's name, address and identification number) of the record are attributed to a column of the table stored in table data 114. However, one of ordinary skill in the art will recognize any database model or structure can be used without deviating from the invention. For example, table data 114 may be stored in a markup language (e.g., eXtensible Markup Language (XML)). In XML, a record or row begins with tags indicating a new record (e.g., <EmployeeRecord> . . . </EmployeeRecord>). Each value for the record also includes tags to indicate the data for the record (e.g., <FirstName>John</FirstName>). As such, while not represented as a table, per se, an XML document still provides records with values.

In various embodiments, columns of table data 114 include entries for data types such as integers, characters or binary data to represent the values in a record. For example, a string of characters may be used for a person's last name and an integer used for the persons age. In other embodiments, columns of table data 114 include entries for objects, pointers or other tables. As an illustrating example, a column refers to another data record in a separate table stored in table data 114. In this example, a record for an invoice has a column with a reference to a data table for purchase orders, where the invoice is referring to the purchase order that initiated the transaction. In some cases, the reference is a pointer. The pointer is a value for a memory address where the purchase order is stored. In other cases, a key value is stored in the column. The key is a unique value that identifies the purchase order. Database management program 112 uses the key to find to match similar keys in the table for the purchase orders.

Figure 4:
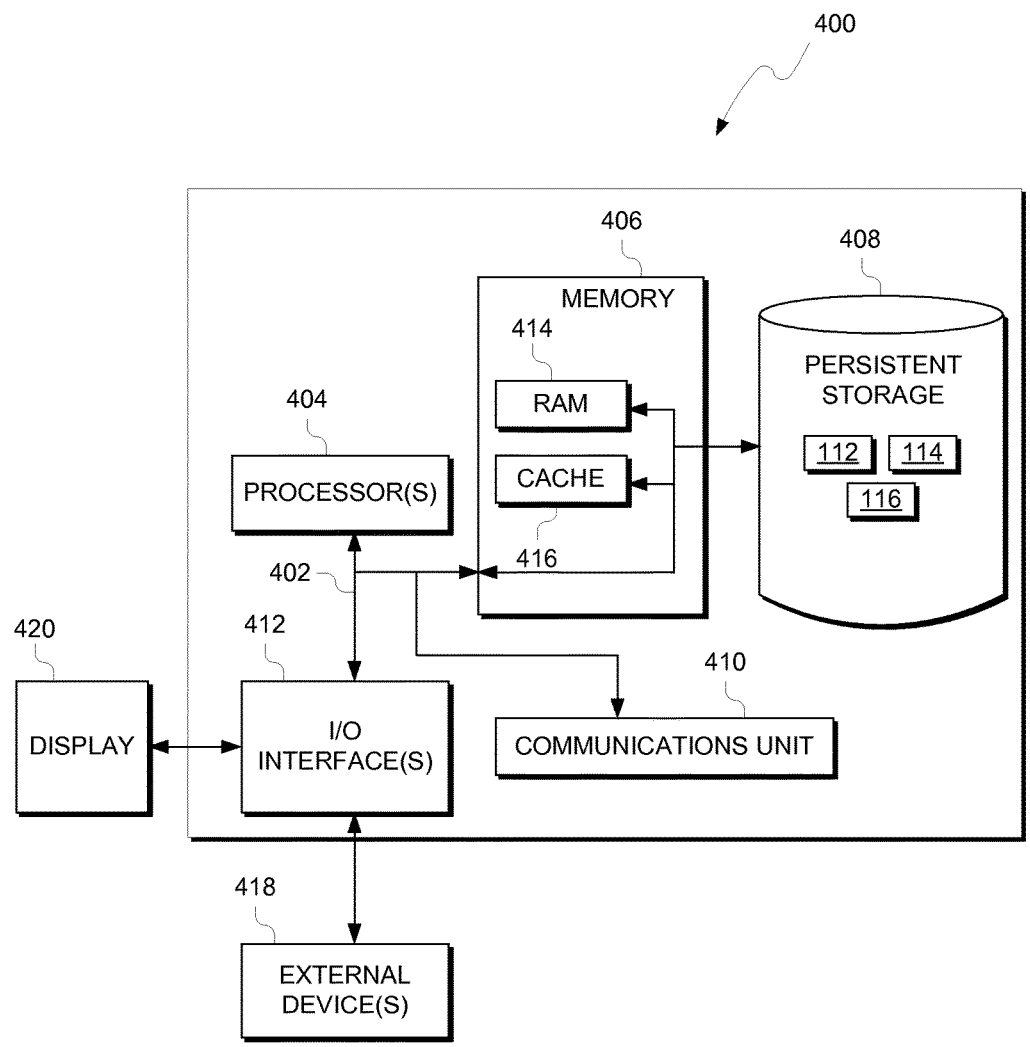
FIG. 4 depicts a block diagram of components of the computing device executing database management program, in accordance with an exemplary embodiment of the present invention.

In various embodiments, tables in table data 114 are stored in a storage device of database 110 (e.g., persistent storage 408 of FIG. 4). A given table can be broken up into one or more pages in the storage device. The records or rows of a table are stored in the pages of a table. When a record in the accessed or processed, database management program 112 retrieves the page that the record is stored on. In some embodiments, each page is a fixed amount of storage (e.g., eight kilobytes). In other embodiments, pages vary in size. In such embodiments, database management program 112 determines the size of variable pages based on the average page size of the pages stored in the storage device of database 110.

In some embodiments, columns of table data 114 include a prefix for the data stored in the column of a record. A prefix includes a subset of the data for a given column of a record. By requiring less data, a prefix allows search queries to be performed faster by requiring less system memory when finding matches in table data 114. A prefix is chosen so that a portion of search queries will not require the entire value for the column. For example, a target of 75% of search queries will be successful without requiring the entire data of a column to be provided (e.g., a second search would be required). In cases where a prefix is not present in table data 114 for a column, database management program 112 generates a prefix for the column. Database management program 112 analyzes the data for all records in a column. Based on the analysis, database management program 112 determines a prefix length such that the target rate without second search is achieved. For example, database management program 112 analyzes the column data for a phone number field. The table has records for users from three different area codes (123, 456, and 789). Database management program 112 determines that the first number in the area code is unique (e.g., '1', '2', and '3'). As such, database management program 112 keeps the unique portion and discards the rest when creating a prefix, thereby shortening the length by two digits.

In various embodiments, database management program 112 receives search queries from users to access the rows in table data 114. Each search query includes constraints or other restrictions to one or more values of the columns in table data 114. When queried, database management program 112 returns records that match the constraints or requirements of the search. For example, table data 114 includes a table of products that a company offers for sale, where rows in the table are for the products and the columns describe features and other information about the products. Database management program 112 receives a search query to return records (i.e., products) where the column of the record that indicate price is less than ten dollars. Database management program 112 applies the constraints of the search and returns records that satisfy the constraints (i.e., products less than ten dollars).

In various embodiments, database management program 112 monitors the access of table data 114. As database management program 112 performs queries, database management program 112 collects data regarding the columns contained in the query. For each query received, database management program 112 updates usage data 116 to reflect the contents of the query. In some embodiments, database management program 112 stores a tally of each column contained in a search in usage data 116. Additionally, database management program 112 stores a number of total searches performed. Based on the collected data, database management program 112 determines a frequency that a column for a table is accessed. For example, database management program 112 receives eight searches including the last name column, four searches including the address column, and two searches including the age column. In this example, ten total searches were performed (e.g., some searches contained more than one column in the query). Given the above, the frequency of the "last name" column was accessed 80% of the time, the "address" column was accessed 40%, and the "age" column was accessed 20% of the time.

In other embodiments, database management program 112 stores, in usage data 116, a moving average of the frequency a column is accessed in search queries. For a given period of time (e.g., hourly or daily), database management program 112 determines an average frequency a column is accessed in received search queries. After the passing of the period, the average is saved in usage data 116 and the queries received during the period are removed. During the following period, search queries are stored in usage data 116. Once the next period ends, the search queries of the ending period are analyzed and combined with the average previously calculated. One of ordinary skill in the art will recognize that any moving average methodology may be used, such as, but not limited to, simple moving averages, weighted moving averages, or exponential moving averages. Moving averages provide a historic average of a value (e.g., the average frequency a column is accessed), without requiring large amounts of storage for the history of the value.

In various embodiments, database management program 112 generates an optimized table for a table stored in table data 114. In some embodiments, database management program 112 receives a request from a user to optimize one or more tables. In other embodiments, database management program 112 automatically optimizes a table based on a schedule (e.g., during downtimes on a weekend) or heuristically (e.g., when page utilization in storage of database 110 falls below a certain percentage). In various embodiments, when optimizing a table, database management program 112 determines a rank for each column based on the following:

$$\text{Rank} = \frac{\text{Frequncy}}{\text{Length}} \quad (\text{E}.1)$$

In E.1 above, database management program 112 determines a "Rank" for a given column based on the frequency the column was accessed, as indicated in usage data 116, and the length of the column. As the frequency a column is accessed increases, database management program 112 determines a higher rank to the column. As length increases, database management program 112 assigns a lower rank to the column. In some embodiments, database management program 112 determines length of a column based on the amount of storage a column occupies in table data 114. For example, a column has a fixed width or size. Even though entries for records do not take the maximum size (e.g., a sixteen character column for first name, where only three characters are used in the record), the size the column is allocated determines the impact the column has on storage. In other embodiments, table data 114 includes variable column lengths. For example, the column includes a special end character or tag to indicate the length of the column for a given record. In such embodiments, database management program 112 determines column length based on the longest entry for the column among all records in the table or tables being optimized.

In various embodiments, database management program 112 determines a base record length. The base record length indicates a starting size that potential combinations of columns can be placed into. Column combinations are groups of columns in table data that will be kept during optimization if selected. Columns not in a selected column combination will be placed in a separate storage of the database. Column combinations not fitting in the base record length will not be considered candidates for optimization at this time, however, as discussed herein, may become optimized tables later in the process. For each record in a table, database management program 112 determines the base record length using the following:

$$\text{Base Length} = \frac{\text{Page Size} * \text{Page Used}}{\text{Max Records per Page}} \quad (E.2)$$

In E.2 above, "Base Length" is a memory size (e.g., two kilobytes) and is the amount of storage that initial columns combinations are restricted to, as discussed herein. "Page Size" is the size of the pages in a storage device of database 110 for the table. For fixed page sizes, the fixed amount is used. For variable page sizes, an average of all page size is used. "Page Used" is a percentage of page utilization for all pages in a storage device of database 110 for the table. For example, in fixed page storage the page size is 2 KB. Database management program 112 determines a page to have the largest amount of utilization among all pages with 1.75 KB of the page being used. As such, the percentage utilized is equal to 87.5%. "Max Records per Page" is the maximum number of records that a given page holds, among all pages in a storage device of database 110. Database management program 112 determines the amount of records in each page. Database management program 112 selects the page with the largest number of records, and uses the number of records for "Max Records per Page". For example, three pages are stored on a storage device of database 110 for a table to be optimized. The first page has three records, the second four, and the third five. Database management program 112 selects the third page and uses the amount of pages for the value of "Max Records per Page" (e.g., "5").

In various embodiments, database management program 112 generates a plurality of combinations for the columns of a table to be optimized. Based on the base length, database management program 112 selects a column stored in the table being optimized. Given the length of the column does not exceed the base length, database management program 112 includes the column to the combination. Database management program 112 continues to add columns for each combination, given the additional column does not increase the total length of the columns in the combination beyond the base length. For example, a first column is 32 bytes long, a second column is 96 bytes long, and a third column is 128 bytes long. The base length for the table is determined to be 160 bytes long. Database management program 112 generates a column combination of the first and second column, since the resulting total of including the third column would exceed the base length. Database management program 112 generates another column combination of the first and third columns, since resulting the total of including the second column would exceed the base length. In some embodiments, database management program 112 generates column combinations for all possible combinations of the columns in a table, given that the combination does not exceed the base length. In other embodiments, database management program 112 orders the columns based on the columns' rank as determined in E.1. Database management program 112 populates a set of column combinations based on the ranking of the columns (e.g., the highest ranked column populates a first combination, the second highest column populates a second combination, the third highest column populates a third combination, etc.). Once populated, database management program 112 determines if additional columns can be added without exceeding the base length. Database management program 112 includes the additional columns based on the rank of the column (e.g., the second highest column is analyzed against the first combination to see if the length of all columns exceed the base length).

In various embodiments, database management program 112 determines an optimization ratio for each column combination based on the following $$OR = \frac{\text{Combination Frequency} * \min(\text{Page Size} * \text{Page Used} / \text{Record Length, Max Records per Page})}{\text{Total Records}} \quad (E.3)$$

In E.3 above, "OR" is the optimization ratio of a combination. "Combination Frequency" is the average frequency the combination has been accessed, as indicated in usage data 116. For example, three columns are in a combination, with access frequencies of 15%, 40% and 80%. The "Combination Frequency" is an average of the access frequencies for the three columns, or 45%. "Total Records" are the total number of records in the table being optimized "Page Size" and "Page Used" are the same values used in E.2, where both are the page size of the table and the utilization of page for the table, respectively. "Record Length" is the storage length of a record in the table. For example, database management program 112 adds the storage length of each column in a record to determine the length of the entire record. In some embodiments, when a prefix is present in columns of the records, database management program 112 uses the length of the prefix for the length of the column. "Max Records per Page" is the same value used in E.2, where the value equals the maximum number of records for a page in all pages of the table.

In various embodiments, database management program 112 adds columns to the column combinations. Based on the rank of the column, database management program 112 adds the highest ranked column not currently present in a given combination to the combination. For example, if a combination includes a first and fourth column and the ranks are as follows (e.g., highest to lowest), first, third, fourth and second, then database management program 112 adds the third column to the combination. Once added, database management program 112 determines a new optimization ratio for the new combination. If the optimization ratio increases, then database management program 112 keeps the new combination. If the optimization ratio does not increase by the addition of the column, database management program 112 adds the next highest-ranking column. Database management program 112 continues to add columns, based on rank, all columns have been added and optimization ratio is determined and compared to the prior ratio. Database management program 112 performs this iterative analysis for each combination, adding columns and order of rank and keeping the columns that increase the optimization ratio in the combination. Once exhausted, database management program 112 selects the combination with the highest optimization ratio to optimize the table.

In various embodiments, database management program 112 takes the columns of the table stored in table data 116 not included in the selected combination (i.e., the combination with the highest optimization ratio) and places the columns in another table. The columns are omitted from the combination due to the columns lack of frequency in access. In some embodiments, database management program 112 chooses a different storage device to store the omitted columns as opposed the storage device the table was originally stored on in database 110. For example, the separate storage device may have a lower read speed or may have a lower cost. By placing the columns with less frequent access, while ensuring high page utilization, database management program 112 creates faster access times for commonly received search queries. In other embodiments, database management program 112 stores the omitted columns of the selected combination in a partition or separate portion of the storage device where the table was originally stored in database 110. In another embodiment, database management program 112 applies compression algorithms to the omitted columns once moved to a different storage device or partition.

In various embodiments, once the omitted columns are moved or partitioned, database management program 112 updates table data 114 to include pointers to the location or partition of the omitted columns in the combination. When database management program 112 receives queries regarding the omitted columns, database management program 112 refers to the pointers in table data 114 to retrieve and access the values for the records regarding the omitted columns and the columns locations. In some embodiments, the omitted columns may be stored in a variety of different devices and locations. As such the pointers provide the information (e.g., drive letters, IP addresses, or memory location) to find and locate the omitted columns from the optimized table.

Figure 2A:
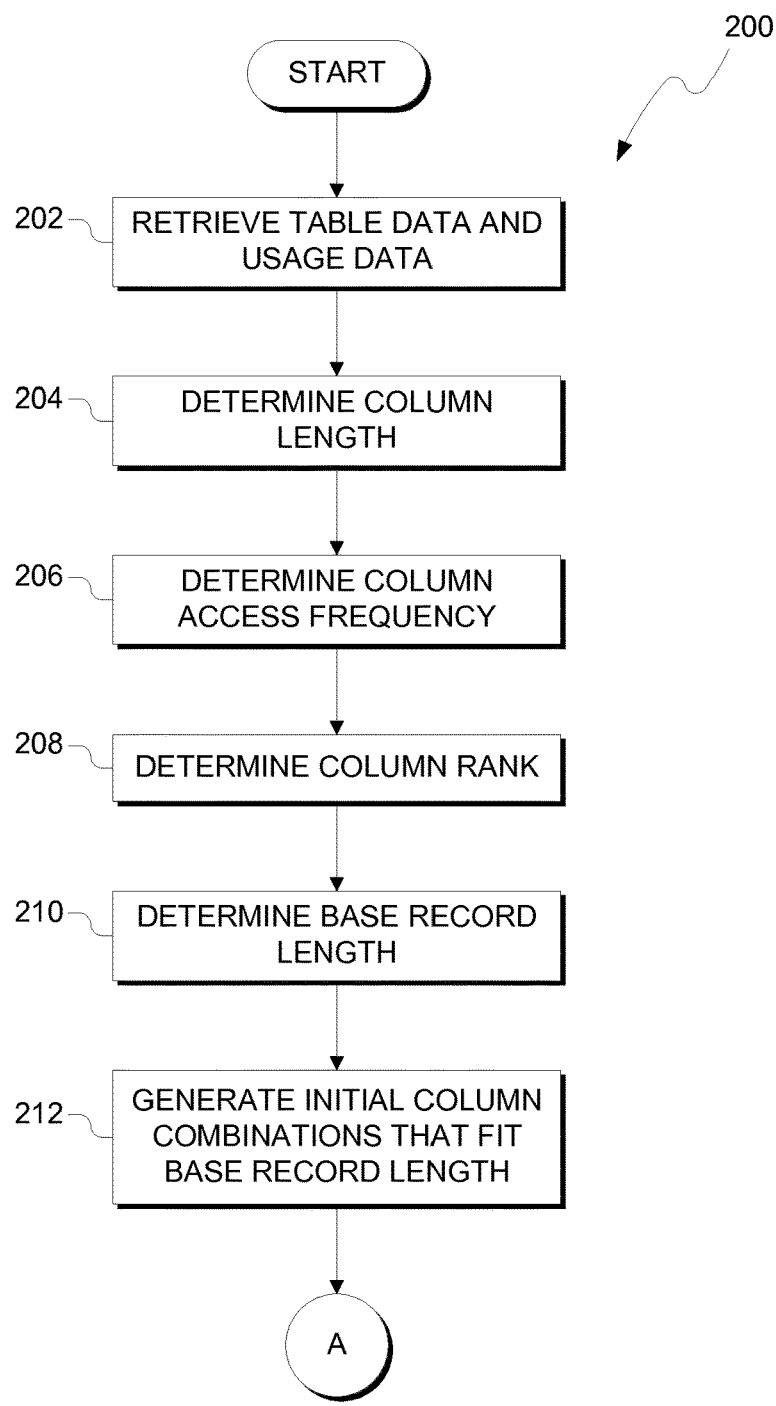
FIGS. 2A & 2B illustrate operational processes of a database management program, on a computing device within the environment of FIG. 1, in accordance with an exemplary embodiment of the present invention.
Figure 2B:
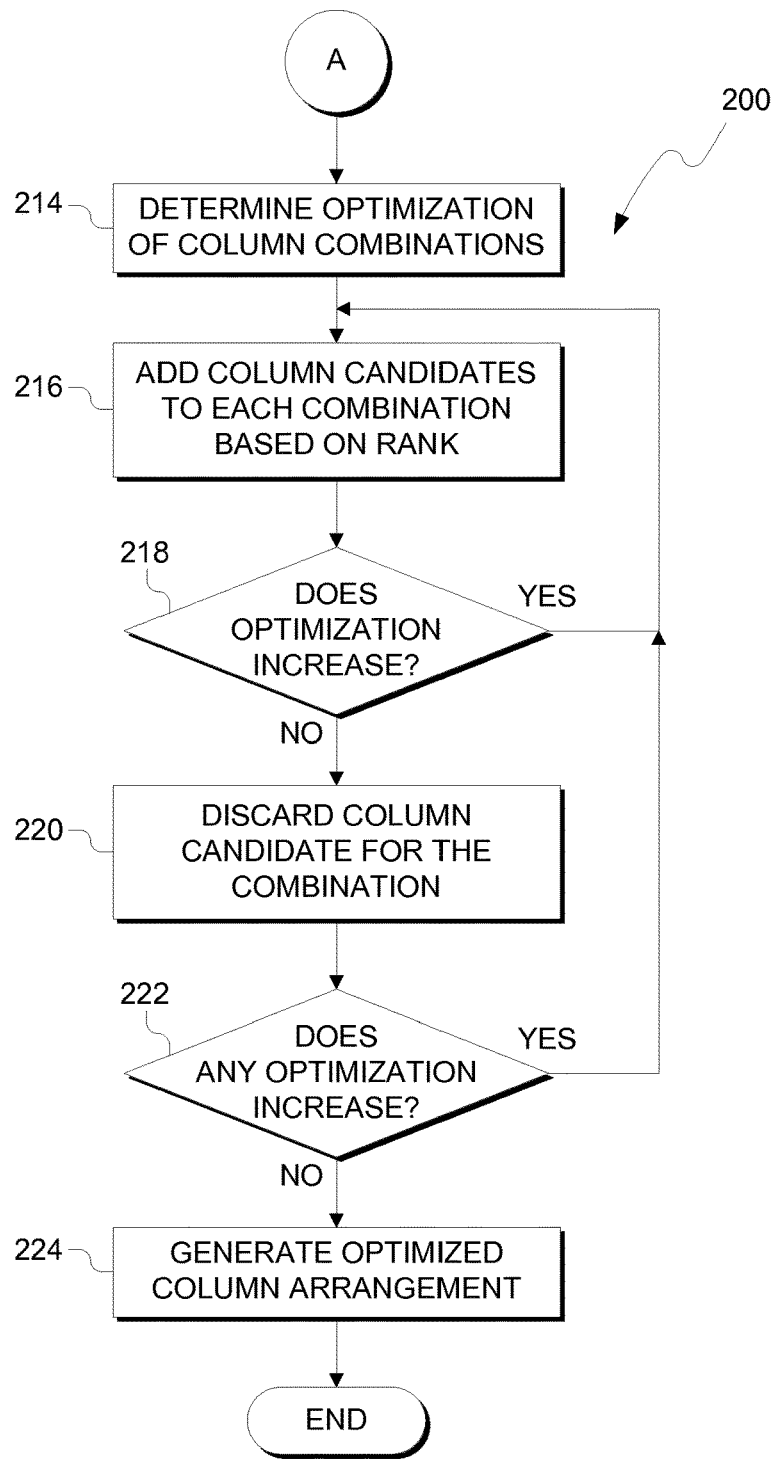

FIGS. 2A & 2B illustrate operational processes, generally designated 200, of database management program 112, on a computing device within the environment of FIG. 1, in accordance with an exemplary embodiment of the present invention.

In process 202, database management program 112 retrieves table data 114 and usage data 116 to optimize a table stored in table data 114. Database management program 112 retrieves the table to be optimized in table data 114. Database management program 112 retrieves the usage data 116 of the columns stored in the table to be optimized. In some embodiments, database management program 112 optimizes tables in table data 114 automatically. For example, database management program 112 optimizes one or more tables at a predefined time. As another example, database management program 112 optimizes a table based on a heuristic (e.g., a certain amount of time has passed since the table was last optimized). In other embodiments, database management program 112 optimizes a table based on receiving input from a user.

In process 204, database management program 112 determines the column lengths for all columns in the table to be optimized Database management program 112, determines the amount of storage each column occupies in a record of the table. In some embodiments, the length of the column is the amount of storage a column is allocated for the table. For example, a column can store thirty-two characters of plain text where each character is stored in eight bits. Database management program 112 determines that the length of the column is thirty-two bytes. In other embodiments, the amount of storage allocated for each value of a column for different records varies for each record. Database management program 112 determines the length of the column based on (i) the value with the largest amount of storage or (ii) an average of the amount of storages of the various values in the table for the given column. In other embodiments, database management program 112 bases the length of the column if the column includes a prefix. A prefix includes a portion of the data stored in the column. In such cases when database management program 112 receives a search query, database management program 112 compares the values of the query to the prefix content. Given a match can be found, the prefix allows for more efficient processing of column values for records without retrieving the entire value for the columns.

In process 206, database management program 112 determines a column access frequency for each column in the table to be optimized. Database management program 112 analyzes usage data 116 to determine the frequency a column is accessed by search queries received by database management program 112. In some embodiments, database management program 112 maintains a running tally of each incoming search query and the columns the query requested to be searched. Based on the overall number of queries received, database management program 112 determines the frequency each column was present in the received searches. In other embodiments, database management program 112 maintains a moving average of a columns access frequency. Database management program 112 stores a moving average for each column in usage data 116. In response to receiving a search query, database management program 112 updates the moving average for each column The access frequency average for columns included in the query will be increased and the access frequency average for columns not included in the query will be decreased.

In process 208, database management program 112 determines a column rank for each column. Based on equation E.1, database management program 112 determines a rank for a column based on the frequency the column is accessed in search queries and the length of the column (e.g., the amount of storage the columns occupies in table data 114). A higher rank indicates columns that may serve as better candidates for an optimal table, due to the higher amount of searches accessing the column and smaller amount of storage the column occupies. In process 210, database management program 112 determines a base record length. Based on equation E.2, database management program 112 determines a base record length for potential column combinations. The base record length creates an initial maximum amount of storage potential candidates of column combinations are considered. The base record length is a uniform distribution of storage in a page of storage that a table is separated across. The amount of a page's utilization and the number of records stored within the utilization indicates a basic unit that columns can occupy.

In process 212, database management program 112 generates a set of initial column combinations that fit the base record length determined in process 210. Database management program 112 selects a column from the table. If the column is less than the base record length, then database management program 112 adds the column to the combination. Database management program 112 adds another column from the table. If the total length of both columns exceeds the base record length, then database management program 112 does not include the column in the initial combination. If the total length of both columns is less than the base record length, then database management program 112 includes the column in the initial combination. In some embodiments, database management program 112 selects columns to add based on the rank determined in process 208. Columns with higher ranks are considered first to be added to a combination, followed by columns with lower ranks. In other embodiments, database management program 112 generates all potential combinations of columns in a table that fit within the base record length. In another embodiment, database management program 112 limits the number of combinations generated to a predetermined number. For example, database management program 112 is allocated a limited amount of space for column combinations. Database management program 112 generates a set of column combinations that fit within the allocated space.

In process 214, database management program 112 determines the optimization ratio of each column combination generated in process 212. Based on E.3, database management program 112 determines the optimization ratio for each column. Database management program 112 assigns column combinations with columns that have higher access frequencies and page utilization resulting in a higher optimization ratio. In process 216, database management program 112 adds a column candidate to each column combination, generated in process 212, based on the rank of the column candidate. Database management program 112 selects the column with the highest column ranking, as determined in process 208, to add as a candidate, given that the column is not included in the combination already.

In process 218, database management program 112 determines a new optimization ratio for the column combination, including the column candidate. If the optimization ratio increases (YES branch of process 218), then database management program 112 includes the candidate in the combination. Database management program 112 continues to process 216 to add additional column to the combination. If the optimization ratio does not increase when adding the column candidate to the combination (NO branch of process 218), then database management program 112 discards the column candidate from the combination (process 220). For each combination, database management program 112 performs processes 216 and 218. After each iteration of adding candidates (process 216) and determining if the candidate added to combinations increases the optimization ratio, database management program 112 determines if any optimization ratio of the column combinations has increased (process 222). If the optimization ratio of a combination increases (YES branch of process 222), then database management program 112 continues to add candidates to the combinations. If no additional candidates increase any optimization ratio of the column combination (NO branch of process 222), then database management program 112 selects the combination with the highest optimization ratio as the optimal combination of columns.

In process 224, database management program 112 generates an optimized column arrangement for the selected column combination. The selected column combination indicates the most frequently accessed columns that achieve the best utilization of the page storage used by the table. The columns not included in, or excluded by, the selected combination are modified to provide optimal storage of the columns in the selected combination. In some embodiments, the columns excluded in the combination are moved to another storage device or partition of the same storage device. For example, database 110 includes a primary storage device used to store table data 114. Database 110 also includes a secondary storage device. The secondary storage device has a lower read speed. Due to the excluded columns having less access or page utilization, database management program 112 moves the excluded columns to the secondary storage device. Furthermore, database management program 112 adds a pointer to table data 114 as stored on the primary storage device indicating the location of the moved columns excluded from the selected combination. In other embodiments, database management program 112 applies compression to the columns excluded from the selected combination. By compressing the excluded columns, more efficient storage space can be achieved with minimum impact on access speeds, due to the lower access frequency of the excluded columns.

FIGS. 3A-3D provides a visualized example of the operational processes of database management program 112, on a computing device within the environment of FIG. 1, in accordance with an exemplary embodiment of the present invention.

Figure 3A:
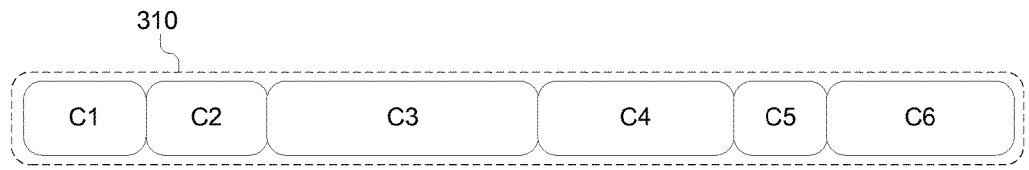
FIGS. 3A-3D provides a visualized example of the operational processes of a database management program, on a computing device within the environment of FIG. 1, in accordance with an exemplary embodiment of the present invention.
Figure 3B:
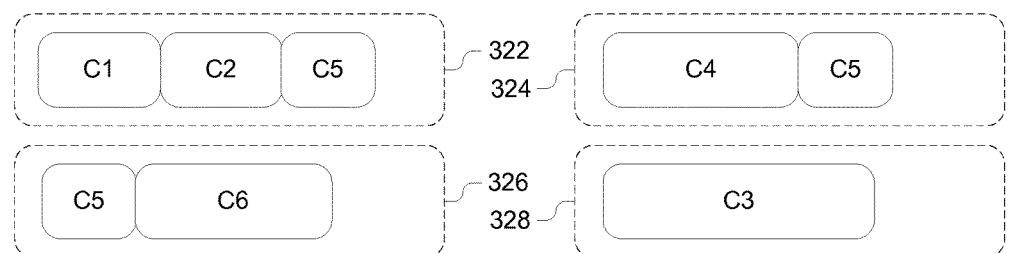

FIG. 3A illustrates the columns of a table 310 that has been selected to be optimized Table 310 includes six columns (C1, C2, C3, C4, C5, and C6). The size of the columns illustrate the length of the columns. FIG. 3B illustrates four initial column combinations 322, 324, 326, and 328. In this illustrative example, the dotted line surrounding each initial column combinations 322, 324, 326, and 328 represents the base record length (e.g., as determined by E.2). Database management program 112, when generating initial column combinations 322, 324, 326, and 328, selects column combinations that fit with the base record length. In this example, C1, C2 and C5 fit within the base record length for initial column combination 322. Including an additional column from table 310 to initial column combination 322 (e.g., adding C3, C4, or C6) would exceed the base record length and, as such, database management program 112 does not include the additional columns to initial column combination 322.

Figure 3C:
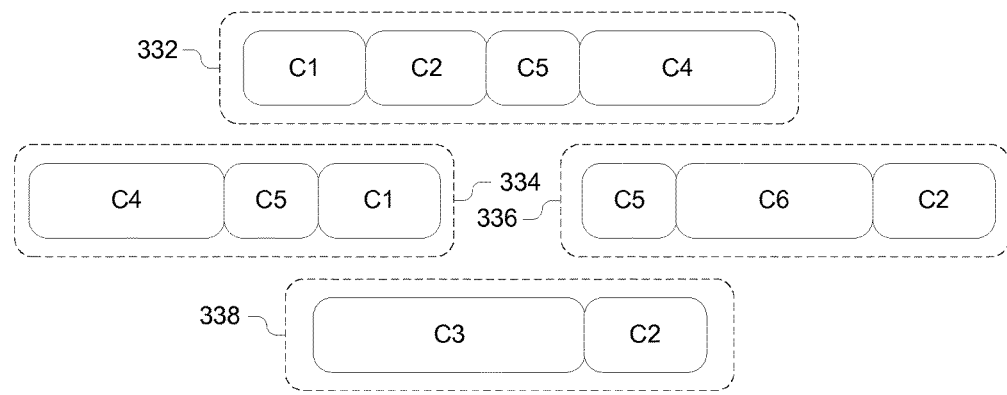

FIG. 3C. illustrates four new column combinations 332, 334, 336 and 338. In this illustrative example, database management program 112 has added a new column to each of the initial column combinations 322, 324, 326 and 328. Database management program 112 added column C4 to initial column combination 322 to create new column combination 332. Database management program 112 added column C1 to initial column combination 324 to create new column combination 334. Database management program 112 added column C2 to initial column combination 326 to create new column combination 336. Database management program 112 added column C2 to initial column combination 328 to create new column combination 338.

In this example, database management program 112 has calculated a rank for each column. The rank, in descending order, starts with C5 as the highest followed by C4, C2, C1 and C3, with C6 having the lowest rank. Looking at new column combination 332, database management program 112 has added C4 to initial column combination 322. Based on the above rank order, C4 is the highest ranking column not included in the column, as such, database management program 112 adds the column to the combination. Looking at new column combination 336, database management program 112 has added C2 to initial column combination 326. Based on the above rank order, database management program 112 created a new column combination (not shown) that included C4. However, database management program 112 did not keep the combination, instead C2 is kept. In this example, C4 has a much greater length and, as such would contribute to a lower page utilization if used (e.g., fewer records could be stored per page if C4 is used). On the other hand, C2 has a shorter length. Also in this example, C2 and C4 have similar access frequencies, with C4 slightly above C2. Consequently due to the similar frequencies but dissimilar lengths, database management program 112 adds C2 to initial column combination 326 to create new column combination 336. As discussed herein, the differences in candidates for adding to column combinations is determined based on the optimization ratio of all columns in the combination. So in this example, the addition of C2 creates a more optimal column combination than initial column combination 326 via new column combination 336.

Figure 3D:
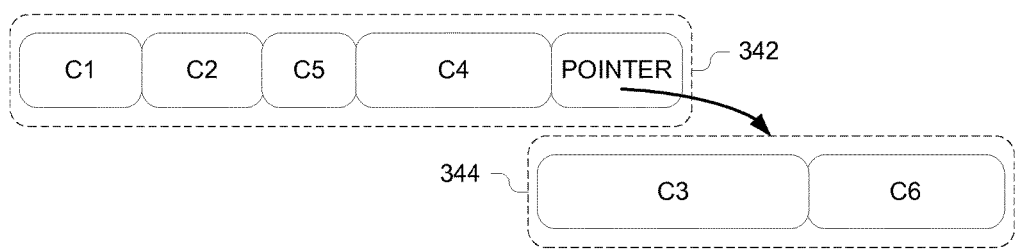

FIG. 3D illustrates the selected column combination with the highest optimization ratio after considering the possible candidates not included in initial column combinations 322, 324, 326 and 328. Database management program 112 determines the selected column combination to be new column combination 332. New column combination 332 has the highest optimization ratio of all other new column combinations 334, 336 and 338. Also new column combination 332 has the highest optimization ratio when compared to initial column combinations 322, 324, 326 and 328. Once the column combination with the maximum optimization ratio is determined, database management program 112 generates an optimized column assignment. In this example, optimized column assignment includes keeping optimal column combination 342 (e.g., C1, C2, C5 and C4) on a primary storage device (e.g., the storage location of table 310) of database 110 and excluded columns 344 (i.e., C3 and C6) from the optimal column combination will be moved to a secondary storage device. Database management program 112 moves excluded columns 344 from table 310 to the secondary storage device. Database management program 112 creates a pointer with the location (e.g., drive location) of excluded columns with optimal column combination 342. The pointer provides database management program 112 with a reference to excluded columns 344. Such as if a search query is received referencing excluded columns 344, database management program 112 can retrieve the column values for C3 and C6.

FIG. 4 depicts a block diagram, 400, of components of database 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Database 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Database management program 112, table data 114, and usage data 116 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 120. In these examples, communications unit 410 includes one or more network interface cards. Communications unit 410 may provide communications through the use of either or both physical and wireless communications links. Database management program 112, table data 114, and usage data 116 may be downloaded to persistent storage 408 through communications unit 410.

I/O interface(s) 412 allows for input and output of data with other devices that may be connected to database 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., database management program 112, table data 114, and usage data 116, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method of optimizing a database, the method comprising:

determining, by one or more processors, a frequency of search for a plurality of columns in a table;
generating, by the one or more processors, at least one prefix value column corresponding to a column of the plurality of columns in the table, wherein the prefix value column has a prefix length shorter in length than the column of the plurality of columns in the table;
determining, by the one or more processors, a rank for the plurality of columns based on (i) the frequency of search, (ii) the length of the plurality of columns, and (iii) the prefix length of the at least one prefix value column;
generating, by the one or more processors, a first set of combinations of the plurality of columns;
determining, by the one or more processors, an optimization of the first set of combinations of the plurality of columns, wherein the optimization is based, at least in part, on (i) the frequency of search for the plurality of columns included in the first set of combinations and (ii) a page utilization of the plurality of columns comprising the at least one prefix value column included in the first set of combinations;
selecting, by the one or more processors, an optimal combination of the first set of combinations, wherein the optimization of the optimal combination is greater than the optimization for all other combinations in the first set of combinations; and
moving, by the one or more processors, the plurality of columns excluded from the optimal combination.

2. The method of claim 1, wherein moving the plurality of columns excluded from the optimal combination further comprises:
moving, by the one or more processors, the plurality of columns excluded from the optimal combination to a separate storage device than a storage device storing the plurality of columns in a table.

3. The method of claim 1, wherein moving the plurality of columns excluded from the optimal combination further comprises:
moving, by the one or more processors, the plurality of columns excluded from the optimal combination to a separate partition than a partition storing the plurality of columns in a table.

4. The method of claim 1, the method further comprising:
adding, by the one or more processors, a pointer to the optimal combination of the first set of combinations, wherein the pointer includes the location of the plurality of columns excluded from the optimal combination.

5. The method of claim 1, wherein the first set of combinations is generated based, at least in part, on a minimum length for the first set of combinations.

6. The method of claim 5, the method further comprising:
generating, by the one or more processors, a second set of combinations of the plurality of columns, wherein the second set of combinations is based, at least in part on the first set of combinations and at least one additional column from the plurality of columns excluded from the first set of combinations.

7. A computer program product for optimizing a database, the computer program product comprising:
one or more computer-readable storage media and program instructions stored on the one or more computer-readable storage media, the program instructions comprising:
program instructions to determine a frequency of search for a plurality of columns in a table;
program instructions to generate at least one prefix value column corresponding to a column of the plurality of columns in the table, wherein the prefix value column has a prefix length shorter in length than the column of the plurality of columns in the table;
program instructions to determine a rank for the plurality of columns based on (i) the frequency of search, (ii) the length of the plurality of columns, and (iii) the prefix length of the at least one prefix value column;
program instructions to generate a first set of combinations of the plurality of columns;
program instructions to determine an optimization of the first set of combinations of the plurality of columns, wherein the optimization is based, at least in part, on (i) the frequency of search for the plurality of columns included in the first set of combinations and (ii) a page utilization of the plurality of columns comprising the at least one prefix value column included in the first set of combinations;
program instructions to select an optimal combination of the first set of combinations, wherein the optimization of the optimal combination is greater than the optimization for all other combinations in the first set of combinations; and
program instructions to move the plurality of columns excluded from the optimal combination.

8. The computer program product of claim 7, wherein program instructions to move the plurality of columns excluded from the optimal combination further comprises:
program instructions to move the plurality of columns excluded from the optimal combination to a separate storage device than a storage device storing the plurality of columns in a table.

9. The computer program product of claim 7, wherein program instructions to move the plurality of columns excluded from the optimal combination further comprises:
program instructions to move the plurality of columns excluded from the optimal combination to a separate partition than a partition storing the plurality of columns in a table.

10. The computer program product of claim 7 the program instructions further comprising:
program instructions to add a pointer to the optimal combination of the first set of combinations, wherein the pointer includes the location of the plurality of columns excluded from the optimal combination.

11. The computer program product of claim 7, wherein the first set of combinations is generated based, at least in part, on a minimum length for the first set of combinations.

12. The computer program product of claim 11, the program instructions further comprising:
program instructions to generate a second set of combinations of the plurality of columns, wherein the second set of combinations is based, at least in part on the first set of combinations and at least one additional column from the plurality of columns excluded from the first set of combinations.

13. A computer system for optimizing a database, the computer system comprising:
one or more computer processors;
one or more computer readable storage media; and
program instructions stored on the computer readable storage media for execution by at least one of the one or more processors, the program instructions comprising:

program instructions to determine a frequency of search for a plurality of columns in a table;

program instructions to generate at least one prefix value column corresponding to a column of the plurality of columns in the table, wherein the prefix value column has a prefix length shorter in length than the column of the plurality of columns in the table;

program instructions to determine a rank for the plurality of columns based on (i) the frequency of search, (ii) the length of the plurality of columns, and (iii) the prefix length of the at least one prefix value column;

program instructions to generate a first set of combinations of the plurality of columns;

program instructions to determine an optimization of the first set of combinations of the plurality of columns, wherein the optimization is based, at least in part, on (i) the frequency of search for the plurality of columns included in the first set of combinations and (ii) a page utilization of the plurality of columns comprising the at least one prefix value column included in the first set of combinations;

program instructions to select an optimal combination of the first set of combinations, wherein the optimization of the optimal combination is greater than the optimization for all other combinations in the first set of combinations; and program instructions to move the plurality of columns excluded from the optimal combination.

14. The computer system of claim 13, wherein program instructions to move the plurality of columns excluded from the optimal combination further comprises:

program instructions to move the plurality of columns excluded from the optimal combination to a separate storage device than a storage device storing the plurality of columns in a table.

15. The computer system of claim 13, wherein program instructions to move the plurality of columns excluded from the optimal combination further comprises:

program instructions to move the plurality of columns excluded from the optimal combination to a separate partition than a partition storing the plurality of columns in a table.

16. The computer system of claim 13, the program instructions further comprising:

program instructions to add a pointer to the optimal combination of the first set of combinations, wherein the pointer includes the location of the plurality of columns excluded from the optimal combination.

17. The computer system of claim 13, wherein the first set of combinations is generated based, at least in part, on a minimum length for the first set of combinations.

18. The computer system of claim 17, the program instructions further comprising:

program instructions to generate a second set of combinations of the plurality of columns, wherein the second set of combinations is based, at least in part on the first set of combinations and at least one additional column from the plurality of columns excluded from the first set of combinations.

* * * * *